FRANK V. WALKER, INVENTOR.

BY Lyon & Lyon
ATTORNEYS

United States Patent Office 2,783,101
Patented Feb. 26, 1957

2,783,101

THRUST BEARING SUPPORT

Frank V. Walker, San Fernando, Calif.

Application July 20, 1953, Serial No. 369,117

4 Claims. (Cl. 308—160)

This invention relates to an improved thrust bearing support.

It is desirable in a thrust bearing designed for high unit area loading to avoid metal-to-metal contact of the bearing surfaces. Consequently a film of suitable lubricant is maintained between the bearing surfaces. Such a lubricant film, however, can withstand very little misalignment or uneven distribution of the thrust load.

It is therefore an object of this invention to provide a thrust bearing support which will maintain a uniform distribution of the thrust load upon the lubricant film.

It is a further object of this invention to provide a thrust bearing support which will adjust for misalignment of the components of the bearing without an uneven distribution of the thrust load upon the lubricant film.

It is a further object of this invention to provide a thrust bearing support wherein it can be readily ascertained when misalignment has occurred, the extent of the misalignment, and the origin of the misalignment.

Other objects and advantages will be readily apparent from the following description.

Figure 1:
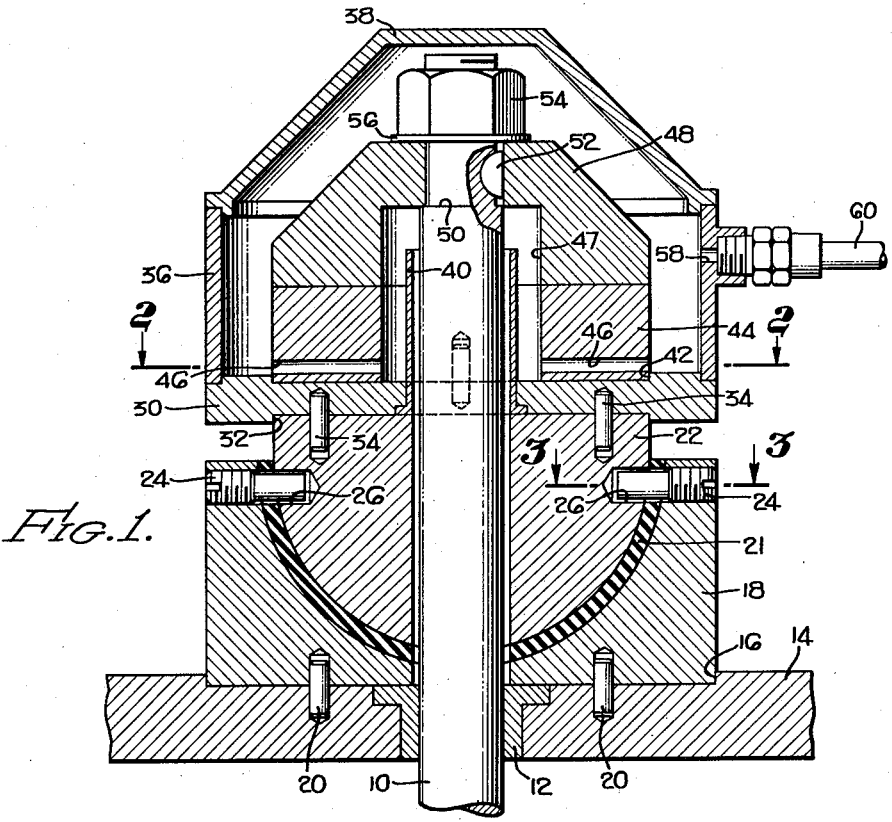
Figure 1 is a sectional view of a thrust bearing embodying this invention.
Figure 2:
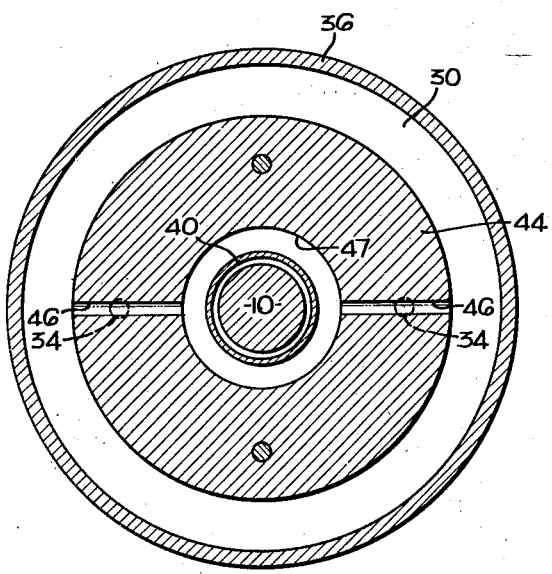
Figure 2 is a section taken along line 2—2 of Figure 1.
Figure 3:
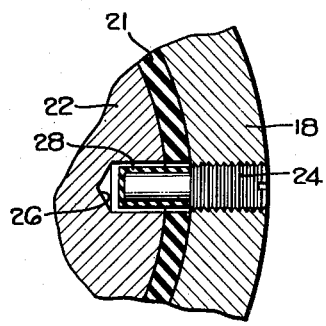
Figure 3 is a section taken along line 3—3 of Figure 1.

A rotating shaft 10 projects through a guide bearing 12 which bearing is mounted in the support plate 14.

The plate 14 is recessed as at 16 and receives the lower bearing support member 18 which is secured against rotation by means of pins 20 which are received in suitable bores in plate 14 and lower support member 18. The lower support member has a spherically concave upper surface which is coated with a suitable resilient electrically nonconductive material 21 which is cemented or otherwise secured thereto. Positioned above the lower bearing support member is the upper bearing support member 22 which is a segment of a sphere having a smaller radius than the radius of the concave upper surface of the lower support so as to be concentric therewith. The sphere segment may also be cemented to the resilient electrically nonconductive material 21 and its radius is shorter than the radius of the concave upper surface of the lower support by a distance equal to the thickness of material 21.

The lower bearing support member is provided with opposed bores through which set screws such as 24 project into recesses such as 26 in the spherical segment 22 preventing rotation thereof. The recesses 26 are slightly larger than the extremities of the screws 24 permitting a small amount of relative movement between the spherical segment 22 and the lower bearing support 18. The set screws are capped with an electrically nonconductive material 28. Thus the spherical segment is electrically insulated from the lower bearing support preventing the oil film in the bearing from being punctured and other deleterious effects of any electrical currents which may be in the mechanism.

It is preferred to form the spherical segment 22 so that it has a cylindrical section at its upper extremity to provide freedom of movement of positioning plate 30 and permit insertion of test instruments when desired.

Positioned above the spherical segment is the positioning plate 30 which is recessed as at 32 to fit onto the top of the spherical segment and is keyed thereto by pins 34 to move with the spherical segment.

The positioning plate 30 is also recessed around its periphery to receive the circular wall 36 of the oil reservoir, which reservoir is completed by a cap 38. The shaft 10 projects through the oil retainer 40 which is carried by positioning plate 30 and the shaft projects into the oil reservoir.

The upper surface of the positioning plate is recessed as at 42 to receive the stationary bearing member 44. This bearing member has an internal bore substantially larger than the diameter of shaft 10 forming a well 47 for lubricating oil, which well communicates with the reservoir through ports such as 46.

Positioned on shaft 10 is the rotating bearing member 48 which has the same external diameter at its lower extremity as the stationary bearing member 44 and also the same internal diameter forming a continuation of well 47. The upper extremity of the rotating bearing 48 is a reduced throat surrounding shaft 10 and engaging the shoulder 50 formed in shaft 10 enclosing well 47. The rotating bearing member 48 is keyed to the shaft 10 as at 52 and hence rotates therewith.

The shaft 10 has at its upper extremity a lock nut 54 through which the thrust is conveyed through washer 56 to the rotating bearing member 48. The oil reservoir is filled through a suitable inlet 58 to which a suitable flexible tubing 60 supplies oil.

It is desirable that the diameter of the spherical segment 22 be equal to the diameter of the stationary and rotating bearing members 44 and 48 to provide maximum sensitivity to misalignment.

In operation there are two basic types of misalignment tending to cause unequal distribution of thrust load on the bearing surfaces referred to as stationary and rotating misalignment. Stationary misalignment is misalignment wherein some component has deviated from true alignment so that the center line of shaft 10 is not normal to the plane of support. Rotating misalignment is where some component element has deviated so that the plane of the rotating bearing member 48 is not normal to the center line of shaft 10.

When either stationary or rotating misalignment occurs in a thrust bearing support embodying this invention, the resilient material 21 flexes to automatically adjust therefor.

By simply inserting a test instrument suitable for evaluating space, at selected points between the upper edge of the lower bearing support 18 and positioning plate 30, and before the mechanism is rotated, the accuracy of alignments can be determined and corrections made if necessary. Thereafter, and with the shaft in rotation, instrument readings at the same selected points will indicate whether rotating misalignment or stationary misalignment or both rotating and stationary misalignment has occurred, and the magnitude and the point of origin of each. Corrections to any misalignment are preferably made with the shaft stationary.

While what hereinbefore has been described is the preferred embodiment of this invention, it is readily apparent that alterations and modifications may be resorted to without departing from the scope of this invention, and such alterations and modifications are intended to be included within the scope of the appended claims.

I claim:

1. A support for a thrust bearing of the type having a stationary bearing plate and a rotating bearing plate mounted upon a rotating shaft and separated by a film of suitable lubricant comprising: a lower bearing support member having a concave upper surface, an upper bearing support member forming a support for said stationary bearing plate and having a convex lower surface concentric to the concave surface of said lower bearing support member, and a layer of resilient electrically nonconductive material between said concave and convex surfaces permitting relative movement between said upper bearing support member and said lower bearing support member for adjusting misalignment and maintaining uniform alignment of the thrust load upon the lubricant film.

2. A support for a thrust bearing of the type having a stationary bearing plate and a rotating bearing plate mounted upon a rotating shaft and separated by a film of suitable lubricant comprising: a lower bearing support member having a concave upper surface, an upper bearing support member forming a support for said stationary bearing plate and having a convex lower surface concentric to the concave surface of said lower bearing support member permitting relative movement between said upper bearing support member and said lower bearing support member for adjusting misalignment and maintaining uniform alignment of the thrust load upon the lubricant film, a positioning plate mounted upon said upper bearing support member forming a base for said stationary bearing plate and spaced from said lower bearing support member permitting insertion of suitable instrument for measuring alignment, and means for insulating electrically said upper and lower bearing members.

3. A support for a thrust bearing of the type having a stationary bearing plate and a rotating bearing plate mounted upon a rotating shaft and separated by a film of suitable lubricant comprising: a lower bearing support member having a concave upper surface, an upper bearing support member forming a support for said stationary bearing plate and having a convex lower surface concentric to the concave surface of said lower bearing support member, a positioning plate mounted upon said upper bearing support member forming a base for said stationary bearing plate and spaced from said lower bearing support member permitting insertion of suitable instrument for measuring alignment, and a layer of resilient material between said concave and convex surfaces permitting relative movement between said upper bearing support member and said lower bearing support member for adjusting misalignment and maintaining uniform alignment of the thrust load upon the lubricant film.

4. A support for a thrust bearing of the type having a stationary bearing plate and a rotating bearing plate mounted upon a rotating shaft and separated by a film of suitable lubricant comprising: a lower bearing support member having a concave upper surface, an upper bearing support member forming a support for said stationary bearing plate and having a convex lower surface concentric to the concave surface of said lower bearing support member, a positioning plate mounted upon said upper bearing support member forming a base for said stationary bearing plate and spaced from said lower bearing support member permitting insertion of suitable instrument for measuring alignment, and a layer of resilient electrically nonconductive material between said concave and convex surfaces permitting relative movement between said upper bearing support member and said lower bearing support member for adjusting misalignment and maintaining uniform alignment of the thrust load upon the lubricant film.

References Cited in the file of this patent

UNITED STATES PATENTS

| | | |
|---|---|---|
| 1,260,548 | Kingsbury | Mar. 26, 1918 |
| 1,608,913 | Stovall | Nov. 30, 1926 |
| 2,138,659 | Kindig | Nov. 29, 1938 |
| 2,196,388 | Ewald | Apr. 9, 1940 |